(12) United States Patent
Armstrong et al.

(10) Patent No.: US 8,594,100 B2
(45) Date of Patent: *Nov. 26, 2013

(54) DATA FRAME FORWARDING USING A DISTRIBUTED VIRTUAL BRIDGE

(75) Inventors: William J. Armstrong, Rochester, MN (US); Claude Basso, Raleigh, NC (US); David R. Engebretsen, Cannon Falls, MN (US); Kyle A. Lucke, Oronoco, MN (US); Jeffrey J. Lynch, Apex, NC (US); David A. Shedivy, Rochester, MN (US); Colin B. Verrilli, Apex, NC (US); Bruce M. Walk, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 708 days.

This patent is subject to a terminal disclaimer.

(21) Appl. No.: 12/751,249

(22) Filed: Mar. 31, 2010

(65) Prior Publication Data

US 2011/0243134 A1    Oct. 6, 2011

(51) Int. Cl.
H04L 12/28    (2006.01)

(52) U.S. Cl.
USPC ............ 370/401; 370/402; 370/386; 370/389

(58) Field of Classification Search
USPC ........................................ 370/392, 420, 390
See application file for complete search history.

(56) References Cited

U.S. PATENT DOCUMENTS

| | | | |
|---|---|---|---|
| 5,901,140 A | 5/1999 | Van As et al. | |
| 6,802,068 B1 | 10/2004 | Guruprasad | |
| 6,807,172 B1 * | 10/2004 | Levenson et al. | 370/389 |
| 6,980,547 B1 * | 12/2005 | Gally et al. | 370/389 |
| 7,023,857 B1 | 4/2006 | Chiussi et al. | |
| 7,107,360 B1 | 9/2006 | Phadnis et al. | |
| 7,138,733 B2 * | 11/2006 | Sanders et al. | 307/147 |
| 7,167,922 B2 | 1/2007 | Narayanan | |
| 7,281,039 B1 | 10/2007 | Salkewicz | |
| 7,751,416 B2 | 7/2010 | Smith et al. | |

(Continued)

FOREIGN PATENT DOCUMENTS

| | | |
|---|---|---|
| WO | 2006093929 A2 | 9/2006 |
| WO | 2009085536 A2 | 7/2009 |
| WO | 2010024993 A1 | 3/2010 |

OTHER PUBLICATIONS

IBM Patent Application entitled "Data Frame Forwarding Using a Multitiered Distributed Virtual Bridge Hierarchy," filed Mar. 31, 2010 by William J. Armstrong et al.

(Continued)

*Primary Examiner* — Hassan Kizou
*Assistant Examiner* — Emmanuel Maglo
(74) *Attorney, Agent, or Firm* — Toler Law Group

(57) ABSTRACT

Systems and methods to forward data frames are provided. A particular method may include receiving a data frame at a distributed virtual bridge. The distributed virtual bridge includes a first bridge element coupled to a first server computer and a second bridge element coupled to the first bridge element and to a second server computer. The distributed virtual bridge further includes a controlling bridge coupled to the first bridge element and to the second bridge element. The controlling bridge includes a global forwarding table. The data frame is forwarded from the first bridge element to the second bridge element of the distributed virtual bridge using address data associated with the data frame. A logical network associated with the frame may additionally be used to forward the data frame.

20 Claims, 8 Drawing Sheets

(56) References Cited

U.S. PATENT DOCUMENTS

| | | |
|---|---|---|
| 7,756,027 B1 | 7/2010 | Reddy et al. |
| 7,831,759 B2 | 11/2010 | Boyd et al. |
| 7,876,746 B1 | 1/2011 | Pannell et al. |
| 7,889,728 B2 * | 2/2011 | Arad et al. .................... 370/389 |
| 7,992,149 B2 | 8/2011 | Carollo et al. |
| 8,054,832 B1 | 11/2011 | Shukla et al. |
| 8,085,791 B1 | 12/2011 | Aggarwal et al. |
| 8,090,805 B1 | 1/2012 | Chawla et al. |
| 8,121,126 B1 | 2/2012 | Moisand et al. |
| 8,190,960 B1 | 5/2012 | Bahadur et al. |
| 8,194,534 B2 | 6/2012 | Pandey et al. |
| 8,271,680 B2 | 9/2012 | Salkewicz |
| 8,345,536 B1 | 1/2013 | Rao et al. |
| 8,358,661 B2 | 1/2013 | Armstrong et al. |
| 8,369,296 B2 | 2/2013 | Armstrong et al. |
| 8,379,642 B2 | 2/2013 | Armstrong et al. |
| 8,385,356 B2 | 2/2013 | Armstrong et al. |
| 8,447,909 B2 | 5/2013 | Corrigan et al. |
| 2003/0037163 A1 | 2/2003 | Kitada et al. |
| 2003/0236852 A1 | 12/2003 | Fernandes et al. |
| 2004/0037279 A1 | 2/2004 | Zelig et al. |
| 2004/0179476 A1 | 9/2004 | Kim et al. |
| 2004/0199698 A1 | 10/2004 | Bolian et al. |
| 2006/0023708 A1 | 2/2006 | Snively et al. |
| 2006/0149886 A1 | 7/2006 | Chen et al. |
| 2006/0248158 A1 | 11/2006 | Ha et al. |
| 2006/0251067 A1 | 11/2006 | Desanti et al. |
| 2007/0047536 A1 | 3/2007 | Scherer et al. |
| 2007/0067432 A1 | 3/2007 | Tarui et al. |
| 2007/0111414 A1 | 5/2007 | Chaudhry et al. |
| 2007/0147368 A1 | 6/2007 | Desai et al. |
| 2007/0184572 A1 | 8/2007 | Kohli et al. |
| 2007/0260910 A1 | 11/2007 | Jain et al. |
| 2007/0266179 A1 | 11/2007 | Chavan et al. |
| 2007/0268830 A1 | 11/2007 | Li et al. |
| 2007/0299987 A1 | 12/2007 | Parker et al. |
| 2008/0002579 A1 * | 1/2008 | Lindholm et al. ............ 370/230 |
| 2008/0056300 A1 | 3/2008 | Williams |
| 2008/0069100 A1 * | 3/2008 | Weyman et al. ............ 370/390 |
| 2008/0109565 A1 | 5/2008 | Ajanovic et al. |
| 2008/0159260 A1 | 7/2008 | Vobbilisetty et al. |
| 2008/0159277 A1 | 7/2008 | Vobbilisetty et al. |
| 2008/0275975 A1 | 11/2008 | Pandey et al. |
| 2009/0037977 A1 | 2/2009 | Gai et al. |
| 2009/0161692 A1 | 6/2009 | Hirata et al. |
| 2009/0201928 A1 | 8/2009 | Chen et al. |
| 2009/0213869 A1 * | 8/2009 | Rajendran et al. ............ 370/420 |
| 2009/0245791 A1 | 10/2009 | Thaler et al. |
| 2009/0252181 A1 | 10/2009 | Desanti |
| 2009/0254677 A1 | 10/2009 | Desanti |
| 2009/0265501 A1 | 10/2009 | Uehara et al. |
| 2009/0276526 A1 | 11/2009 | Carlson et al. |
| 2009/0323518 A1 | 12/2009 | Rose et al. |
| 2010/0036995 A1 | 2/2010 | Nakayama et al. |
| 2010/0067374 A1 | 3/2010 | Elangovan et al. |
| 2010/0085966 A1 | 4/2010 | Samuels et al. |
| 2010/0107162 A1 | 4/2010 | Edwards et al. |
| 2010/0128605 A1 | 5/2010 | Chavan et al. |
| 2010/0150174 A1 | 6/2010 | Bhide et al. |
| 2010/0257263 A1 | 10/2010 | Casado et al. |
| 2010/0257269 A1 | 10/2010 | Clark |
| 2011/0055433 A1 | 3/2011 | Kishore et al. |
| 2011/0061094 A1 | 3/2011 | Salkewicz |
| 2011/0069710 A1 | 3/2011 | Naven et al. |
| 2011/0085546 A1 | 4/2011 | Capello et al. |
| 2011/0085557 A1 | 4/2011 | Gnanasekaran et al. |
| 2011/0103391 A1 | 5/2011 | Davis et al. |
| 2011/0153715 A1 | 6/2011 | Oshins et al. |
| 2011/0243134 A1 | 10/2011 | Armstrong et al. |
| 2011/0258340 A1 | 10/2011 | Armstrong et al. |
| 2011/0261687 A1 | 10/2011 | Armstrong et al. |
| 2011/0261826 A1 | 10/2011 | Armstrong et al. |
| 2011/0262134 A1 | 10/2011 | Armstrong et al. |
| 2011/0264610 A1 | 10/2011 | Armstrong et al. |
| 2011/0320671 A1 | 12/2011 | Armstrong et al. |
| 2012/0027014 A1 | 2/2012 | Mack-Crane et al. |
| 2012/0036236 A1 | 2/2012 | Richardson et al. |
| 2012/0147743 A1 | 6/2012 | Singh et al. |
| 2012/0209940 A1 | 8/2012 | Kidambi et al. |
| 2012/0236858 A1 | 9/2012 | Armstrong et al. |
| 2013/0117469 A1 | 5/2013 | Corrigan et al. |

OTHER PUBLICATIONS

Cisco Systems, "Integrating the Cisco Catalyst Blade Switch 3130 for Dell PowerEdge M1000e Blade Enclosure into the Cisco Data Center Network Architecture—Design Guide", Oct. 2007, retrieved from the Internet: http://cisco.com/en/US/prod/collateral/sw, 29 pages.

Hufferd, John L., "Proxy Based Shortcut", Huffered Enterprises, Oct. 7, 2009, 21 pages.

U.S. Appl. No. 13/352,952 entitled "Requesting Multicast Membership Information in a Distributed Switch in Response to a Miss Event", filed Jan. 18, 2012 by Debra L. Angst et al., 38 pages.

U.S. Appl. No. 13/352,973 entitled "Managing a Global Forwarding Table in a Distributed Switch", filed Jan. 18, 2012 by Debra L. Angst et al., 39 pages.

U.S. Appl. No. 12/751,187; Non-Final Office Action dated May 30, 2012; 15 pages.

U.S. Appl. No. 12/751,187; Notice of Allowance dated Oct. 26, 2012; 7 pages.

U.S. Appl. No. 12/763,306; Non-Final Office Action dated Feb. 27, 2012; 20 pages.

U.S. Appl. No. 12/763,306; Notice of Allowance dated Aug. 1, 2012; 6 pages.

U.S. Appl. No. 12/763,306; Notice of Allowance dated Mar. 14, 2013; 5 pages.

U.S. Appl. No. 12/763,306; Notice of Allowance dated Nov. 14, 2012; 5 pages.

U.S. Appl. No. 12/763,323; Non-Final Rejection dated Mar. 28, 2012; 11 pages.

U.S. Appl. No. 12/763,323; Notice of Allowance dated Sep. 14, 2012; 7 pages.

U.S. Appl. No. 12/765,109; Final Office Action dated Jun. 29, 2012; 13 pages.

U.S. Appl. No. 12/765,109; Non-Final Office Action dated Feb. 8, 2013; 14 pages.

U.S. Appl. No. 12/765,109; Non-Final Office Action dated Mar. 9, 2012; 12 pages.

U.S. Appl. No. 12/765,128; Final Office Action dated Aug. 1, 2012; 12 pages.

U.S. Appl. No. 12/765,128; Non-Final Office Action dated Apr. 3, 2012; 12 pages.

U.S. Appl. No. 12/765,128; Notice of Allowance dated May 13, 2013; 6 pages.

U.S. Appl. No. 12/767,174; Non-Final Office Action dated Feb. 23, 2012; 12 pages.

U.S. Appl. No. 12/767,174; Notice of Allowance dated May 30, 2012; 5 pages.

U.S. Appl. No. 12/767,174; Notice of Allowance dated Oct. 5, 2012; 5 pages.

U.S. Appl. No. 12/767,481; Non-Final Office Action dated Feb. 22, 2012; 10 pages.

U.S. Appl. No. 12/767,481; Notice of Allowance dated Jun. 1, 2012; 5 pages.

U.S. Appl. No. 12/767,481; Notice of Allowance dated Oct. 11, 2012, 5 pages.

U.S. Appl. No. 12/767,506; Non-Final Office Action dated Jan. 18, 2013; 7 pages.

U.S. Appl. No. 12/767,543; Final Office Action dated May 30, 2013; 17 pages.

U.S. Appl. No. 12/767,543; Non-Final Office Action dated Oct. 22, 2012; 15 pages.

U.S. Appl. No. 12/839,099; Final Office Action dated Oct. 25, 2012; 8 pages.

(56) References Cited

OTHER PUBLICATIONS

U.S. Appl. No. 12/839,099; Non-Final Office Action dated Jul. 9, 2012; 7 pages.

U.S. Appl. No. 12/839,099; Notice of Allowance dated Jan. 11, 2013; 5 pages.

U.S. Appl. No. 13/485,766; Non-Final Office Action dated Dec. 13, 2012; 10 pages.

* cited by examiner data frame forwarding using a distributed virtual bridge

I. FIELD OF THE DISCLOSURE

The present disclosure relates generally to data communications, and more specifically, to data frame forwarding between blade server computers.

II. BACKGROUND

Server computers may compete for access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology enclosure (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158, an end of rack switch (EOR) 162, and a top of rack switch 160. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration challenges and complexities, as well as increase latency and hardware costs. It is therefore desirable to increase the efficiency with which data frames may be forwarded between server computers.

III. SUMMARY OF THE DISCLOSURE

In a particular embodiment, an apparatus for forwarding data frames is disclosed. The apparatus includes a plurality of server computers and a distributed virtual bridge. The distributed virtual bridge includes a plurality of bridge elements coupled to the plurality of server computers and configured to forward a data frame between the plurality of server computers. The distributed virtual bridge further includes a controlling bridge coupled to the plurality of bridge elements. The controlling bridge includes a global forwarding table including address data accessible to the plurality of bridge elements.

In another embodiment, a method of forwarding a data frame is disclosed. The method includes receiving a data frame at a distributed virtual bridge. The distributed virtual bridge includes a first bridge element coupled to a first server computer and a second bridge element coupled to the first bridge element and to a second server computer. The distributed virtual bridge further includes a controlling bridge coupled to the first bridge element and to the second bridge element. The controlling bridge includes a global forwarding table. The data frame is forwarded from the first bridge element to the second bridge element of the distributed virtual bridge using address data associated with the data frame.

In another embodiment, a method of forwarding a data frame includes associating a virtual local area network with a data frame that includes address information. A logical network is associated with the data frame, and the data frame is forwarded based upon the virtual local area network, the address information, and the logical network.

In another embodiment, a program product configured to forward a data frame includes program code resident within a memory and configured to be executed by a processor to forward a data frame between server computers by receiving a data frame at a distributed virtual bridge. The distributed virtual bridge includes a first bridge element coupled to a first server computer, a second bridge element coupled to the first bridge element and to a second server computer, and a controlling bridge coupled to the first bridge element and to the second bridge element. The controlling bridge includes a global forwarding table. The program code is further configured to be executed by the processor to forward the data frame from the first bridge element to the second bridge element of the distributed virtual bridge using address data associated with the data frame. The program product further includes a computer readable medium bearing the program code.

An embodiment may facilitate lossless, point-to-point, in-order data frame delivery between bridge elements of a virtual distributed bridge. Fiber Channel over Ethernet may be supported, and an embodiment of a system may be scalable to include hundreds or more server computers with direct connectivity. Data frames may be forwarded between different racks and chassis without traversing a top of rack switch.

Features that characterize the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Figure 1:
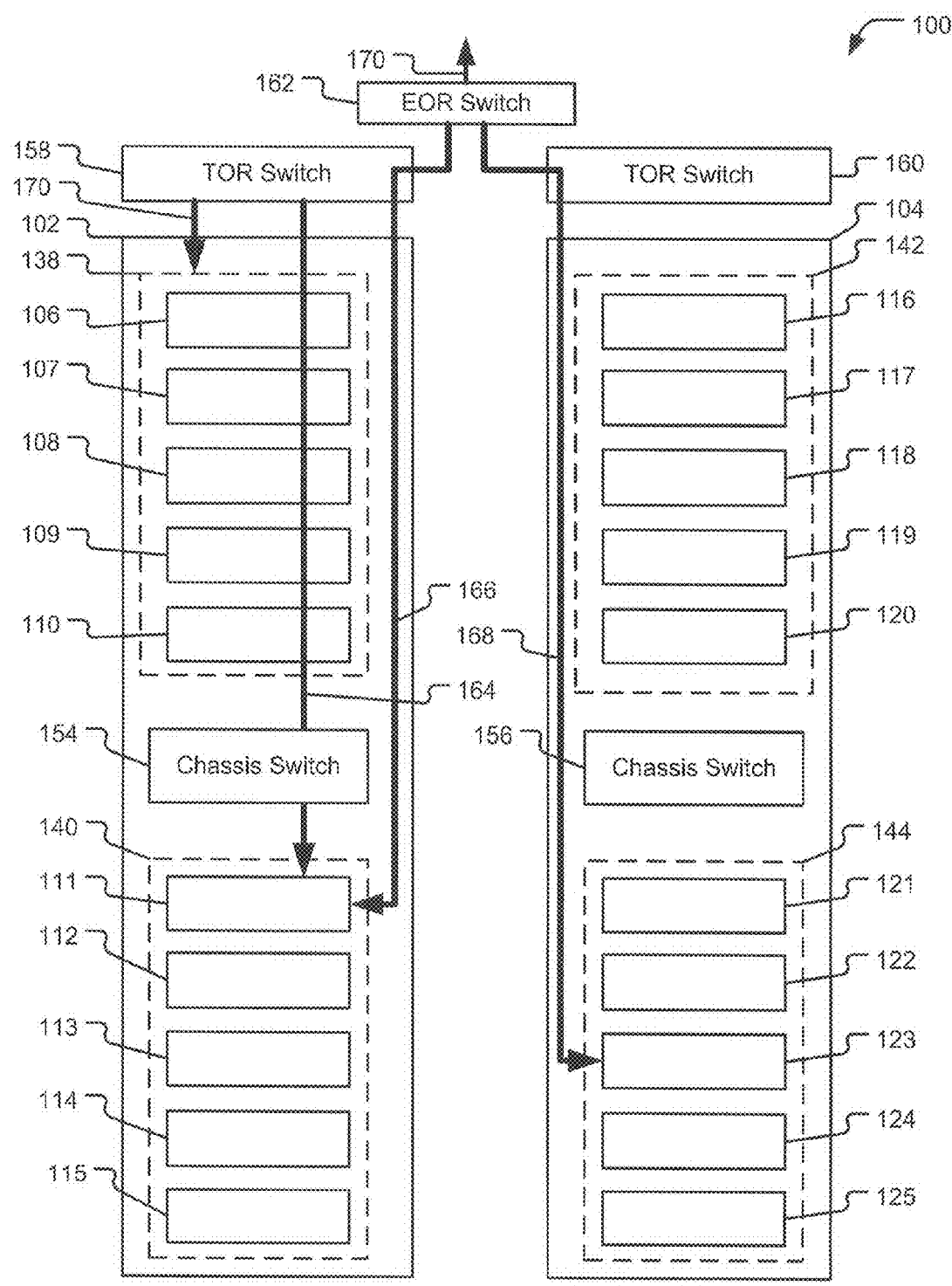
FIG. 1 is a block diagram of a prior art computing system that includes racks of blade server computers.
Figure 2:
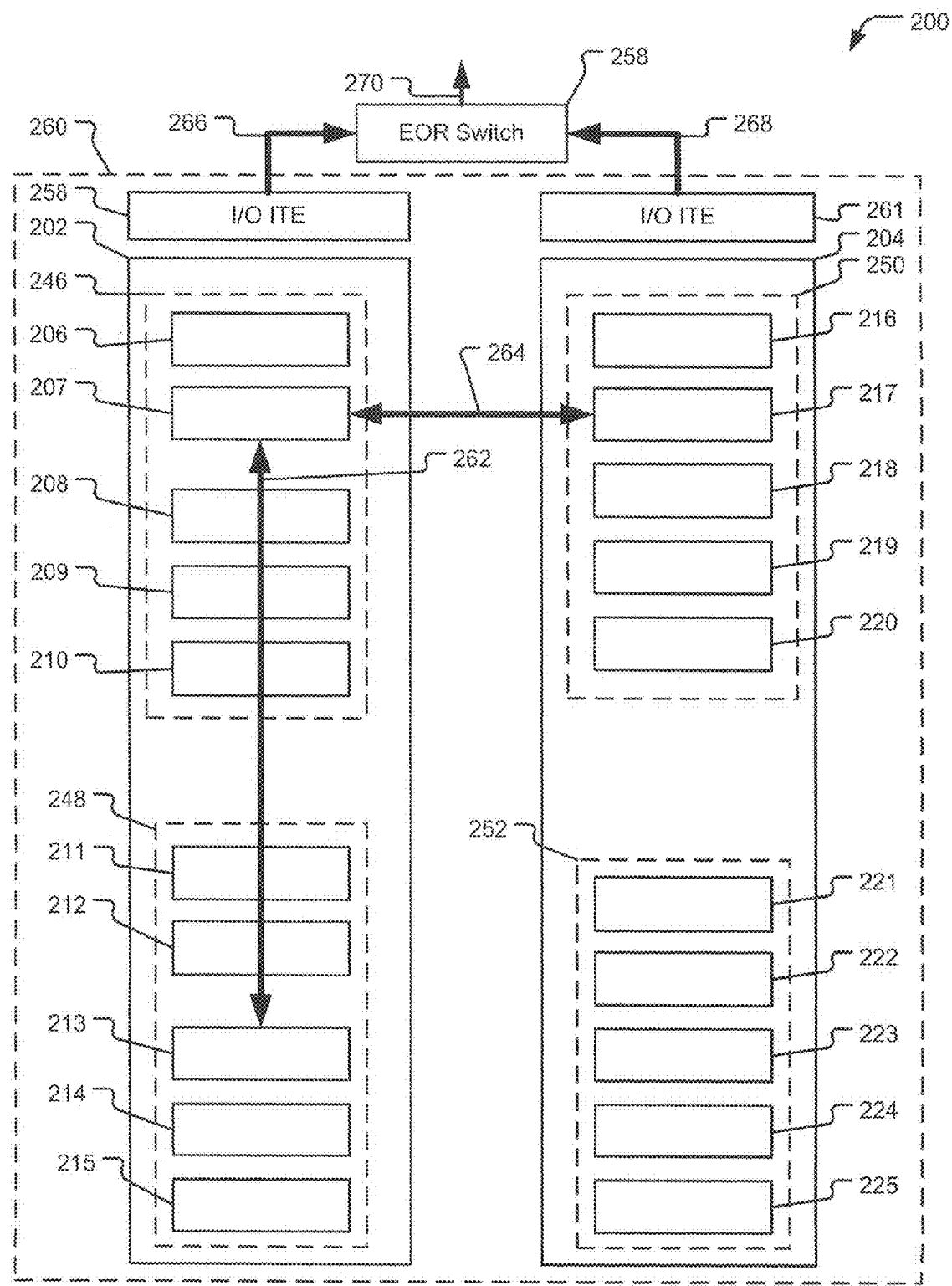
FIG. 2 is a block diagram of an embodiment of a networked computing system configured to allow direct communication between server computers housed within different racks and chassis of blade server computers.

FIG. 2 is a block diagram of a first embodiment of a system 200 configured to provide improved data frame communication between blade server computers. Instead of relying upon numerous top of rack and chassis switches to forward data frames, the system 200 may include a distributed virtual bridge that allows a server computer to directly communicate with another server computer housed within a different rack or chassis.

The server computers may connect to one or more bridge elements that may access address data (e.g., MAC addresses) maintained at a controlling bridge. For example, a bridge element of the distributed virtual bridge may evaluate a forwarding cache for address data. If the address data is absent from the forwarding cache, the bridge element may send a message to a controlling bridge. The controlling bridge may communicate the address data though other bridge elements to the requesting bridge element. The requesting bridge element may learn, or store, the address data within its forwarding cache.

As shown in FIG. 2, a distributed virtual bridge network 260 may extend across server computers 206-225, chassis 246, 248, 250, 252, and racks 202, 204 to provide a multilayer hierarchy with data link layer (i.e., Layer 2) switching between the bridge elements. The system 200 may provide a frame-based, Ethernet-like interface that facilitates lossless, point-to-point, in-order frame delivery between server computers 206-225 of different racks 202, 204 or chassis 246, 248, 250, 252 (i.e., east-west connectivity) without using a top of rack switch.

The system 200 further includes an end-of-rack switch 258 and input/output (I/O) server ITEs 258, 261 that enable north-south connectivity. The I/O server ITEs 254, 256 may enable uplink connectivity to the external Ethernet network (or other network) for the server computers 206-225 housed within the racks 204, 206.

An arrow 264 of FIG. 2 represents direct east-west connectivity and the flow of data frames between server computers located in different racks 202, 204 of the system 200 (e.g., without using a top of rack or chassis switch). An arrow 262 represents direct east-west connectivity across different chassis 246, 248 of the rack 202.

The system 200 of FIG. 2 may thus enable direct connectivity between server computers of different racks or chassis without using a chassis or a top of rack switch. The direct connectivity may facilitate faster processing with reduced contention for resources and increased data frame traffic flow. The system 200 may further facilitate direct connectivity between server computers and at least one of Ethernet adapters and external Ethernet ports. The distributed nature of the system 200 may further provide redundancy and fault tolerance.

Figure 3:
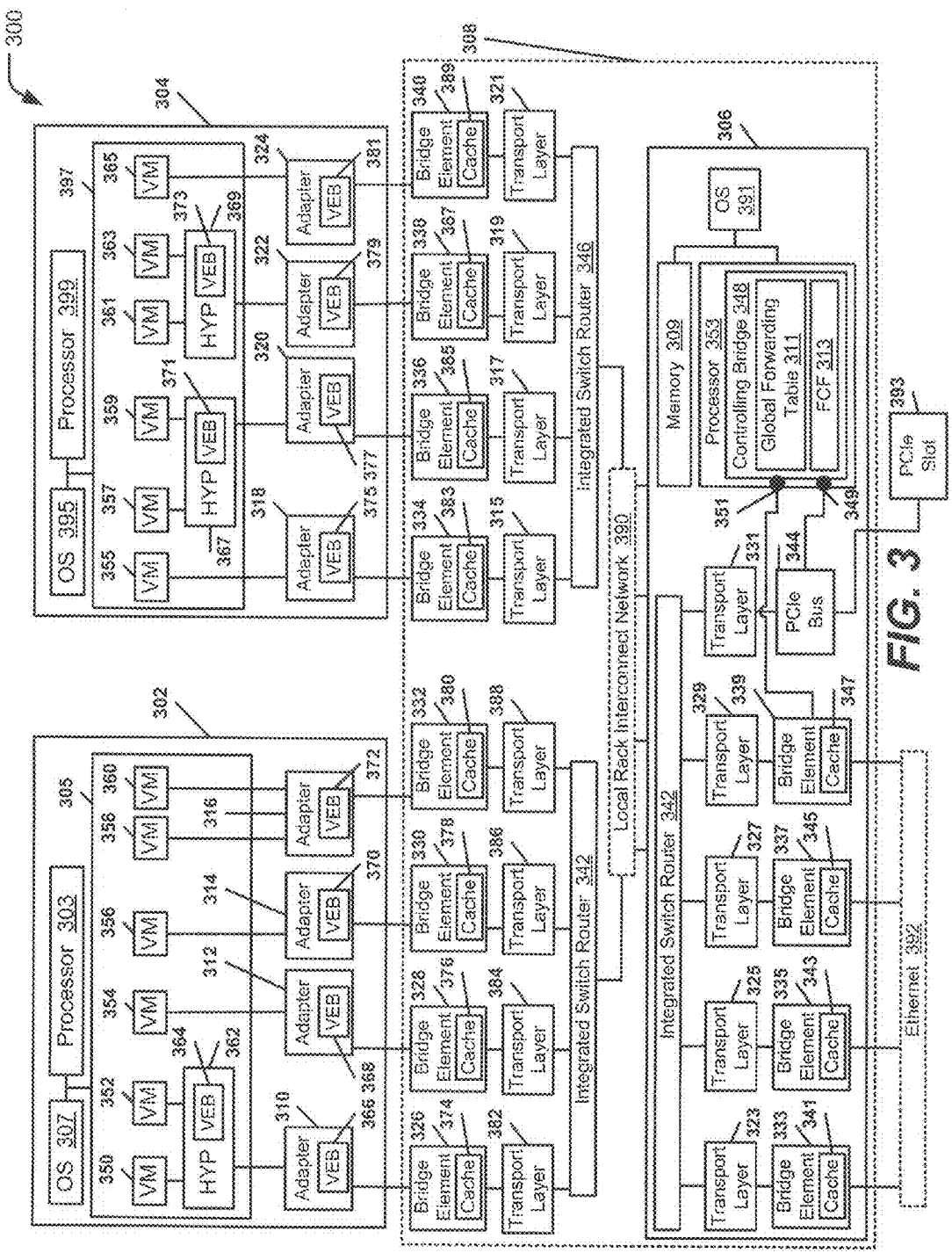
FIG. 3 is a diagram of a particular embodiment of a system configured to forward data frames using a distributed virtual bridge.

Referring to FIG. 3, another particular illustrative embodiment of a system configured to forward data frames is depicted. FIG. 3 generally shows a computer system 300 configured to forward data frames using a distributed virtual bridge 308. The computer system 300 includes a first server computer 302, a second server computer 304, and an I/O blade device 306 that are coupled via the distributed virtual bridge 308. The server computers 302, 304 and the I/O blade device 406 may be housed within separate chassis and racks.

The distributed virtual bridge 308 may be coupled to multiple adapters 310, 312, 314, 316, 318, 320, 322, and 324. The adapters 310, 312, 314, 316, 318, 320, 322, and 324 may be located within or may be coupled to the server computers 302, 304. The distributed virtual bridge 308 may use multiple access points, or bridge elements 326, 328, 330, and 332-340 to couple to the server computers 302, 304 and the I/O blade device 306. For example, a microchip that includes the bridge elements 326, 328, 330, and 332 may be cabled or otherwise coupled to a port of the server computer 302 that includes the adapter 310. As explained herein, the distributed virtual bridge 308 may functionally supplant chassis switches and top of rack switches with a frame-based network fabric that functions in a similar fashion to an Ethernet network.

One or more transport layer modules 382, 384, 386, and 388 coupled to the bridge elements 326, 328, 330, and 332 may provide a frame-based, Ethernet-like interface to one or more integrated switch routers 342. The transport layer module 382 may be configured to deconstruct a transmission of data frames so that packet information may be evenly distributed across links to the local rack interconnect 390. The data frames may not be serialized upon leaving the transport layer module 382. A receiving transport layer module 323 may serialize the data frames to achieve reliable, in-order delivery. If data frame information is determined to be missing by the receiving transport layer module 323, a process may be initiated by the transport layer module 323 to recover the missing data. The translation process may be accomplished in hardware, which may provide a larger bandwidth and faster processing than software applications. The transport layer modules 382, 384, 386, and 388, the integrated switch router 342, and a local rack interconnect network 390 may combine to include an underlying lossless, point-to-point communication network (i.e., an integrated switch router network) between the server computers 302, 304 and the I/O blade device 306.

The bridge elements 326, 328, 330, and 332 may function as data link layer (i.e., Layer 2) bridge forwarders within the distributed virtual bridge 308. The bridge elements 326, 328, 330, and 332 may include learned (e.g., received and stored) cached address data used to forward data frames throughout the distributed virtual bridge 308.

When the bridge element 326 does not include address data pertinent to a source or destination address of a received data frame, the bridge element 326 may query a controlling bridge 348 for the address data. The controlling bridge 348 may include a global forwarding table 311 that includes stored address data. The stored address data may be continuously updated by the bridge elements 326, 328, 330, and 332. For example, a bridge element 326 may send an update message to the controlling bridge 348 in response to learning an updated or new MAC address. A corresponding MAC address in the global forwarding table 311 may be subsequently updated.

Conversely, the address data of the global forwarding table 311 may be used to update the bridge elements 326, 328, 330, and 332. For example, the controlling bridge 348 may respond to a query from the bridge element 326 with requested address data. The bridge element 326 may cache the received address data for future use.

The first server computer 302 may comprise a blade server computer, such as the server computer 206 shown in FIG. 2. The first server computer 302 may include one or more virtual machines (VMs) 350, 352, 354, 356, 358, and 360. A virtual machine may include a software implementation of a computer and may execute programs in a manner similar to a physical machine.

FIG. 3 shows an illustrative hypervisor 362 that is coupled to both the virtual machine 350 and the virtual machine 352.

The hypervisor 362 may include platform virtualization software that allows multiple operating systems to run concurrently on the first server computer 302. The hypervisor 362 may include a hypervisor virtual bridge 364 that allows direct communication between the virtual machines 350, 352 without having to traverse an external network. In one embodiment, the hypervisor virtual bridge 364 may register address information with the controlling bridge 348.

The server computer 302 may include at least one processor 303 coupled to a memory 305. The processor 303 may represent one or more processors (e.g., microprocessors), and the memory 305 may represent random access memory (RAM) devices comprising the main storage of the server computer 302, as well as supplemental levels of memory, e.g., cache memories, non-volatile or backup memories (e.g., programmable or flash memories), read-only memories, etc. In addition, the memory 305 may be considered to include memory storage physically located in the server computer 302 or on another server computer 304 coupled to the server computer 302 via the distributed virtual bridge 308.

The server computer 302 may operate under the control of an operating system (OS) 307 and may execute or otherwise rely upon various computer software applications, components, programs, objects, modules, and data structures, such as the virtual machines 350, 352, 354, 356, 358, and 360. Moreover, various applications, components, programs, objects, modules, etc. may also execute on one or more processors in another device coupled to the server computer 302 (e.g., in a distributed computing environment, where computing processes may be allocated to multiple server computer computers).

The first server computer 302 may include adapters 310, 312, 314, and 316, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 310, 312, 314, and 316 may be used to implement a Fiber Channel over Ethernet (FCoE) protocol. Each adapter 310, 312, 314, and 316 may be coupled to one or more of the virtual machines 350, 352, 354, 356, 358, and 360. The adapters 310, 312, 314, and 316 may facilitate shared access of the virtual machines 350, 352, 354, 356, 358, and 360. While the adapters 310, 312, 314, and 316 are shown in FIG. 3 as being included within the server computer 302, adapters of another embodiment may include physically distinct devices that are separate from the server computers.

Each adapter 310, 312, 314, and 316 may include a converged adapter virtual bridge 366, 368, 370, and 372. The converged adapter virtual bridges 366, 368, 370, and 372 may facilitate sharing of the adapters 310, 312, 314, and 316 by coordinating access by the virtual machines 350, 352, 354, 356, 358, and 360. Each converged adapter virtual bridge 366, 368, 370, and 372 may recognize data flows included within its domain. A recognized domain address may be routed directly, without processing or storage outside of the domain of the particular converged adapter virtual bridge 366, 368, 370, and 372. Each adapter 310, 312, 314, and 316 may include one or more CEE transmit ports that couple to one of the bridge elements 326, 328, 330, and 332. In another embodiment, the bridge elements may be co-located with the adapters, and the coupling between adapters and the bridge elements may not be Ethernet connections.

The bridge elements 326, 328, 330, and 332 may be configured to forward data frames throughout the distributed virtual bridge 308. The bridge elements 326, 328, 330, and 332 may thus function as access points for the distributed virtual bridge 308 by translating between Ethernet and the integrated switch router 342. The bridge elements 326, 328, 330, and 332 may not include buffers and may support CEE at boundaries of the distributed virtual bridge 308. In another embodiment, the bridge elements 326, 328, 330, and 332 may include buffers.

Each bridge element 326, 328, 330, and 332 of the distributed virtual bridge 308 may include a forwarding cache 374, 376, 378, and 380. A forwarding cache 374, 376, 378, and 380 may include a lookup table that comprises address data used to forward data frames that are received by the bridge elements 326, 328, 330, and 332. For example, the bridge element 326 may compare address data associated with a received data frame to the address data stored in the forwarding cache 374.

Illustrative address data may include routing information, such as a routing key that includes bytes of the header data of the data frame. The routing key may include at least one of a virtual local area network (VLAN) tag and a logical network identifier, as well as a MAC address. The MAC address may be generated and assigned by a Fiber Channel Forwarder (FCF) 313, as set by an administrator or computing system.

A VLAN tag may indicate an assigned VLAN, which may be used to segregate traffic and to allow more than one uplink. There may be multiple VLANs on an uplink. Conventionally, each VLAN may use only one uplink port. That is, only one physical, uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 308. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

Each physical port (e.g., an adapter or Ethernet uplink) of the distributed virtual bridge 308 may be associated with a single logical network. Each logical network may therefore have an uplink to the external Ethernet network. Where an uplink is an aggregated link, VLANs may be used to segregate traffic to multiple uplinks.

A logical network may have distinct forwarding and traffic management resources. For example, a bridge element 326 may include flow control modules and queues that are assigned to a logical network. Communication between adapters associated with different logical networks may occur through an external network. No east-west traffic may be allowed between logical networks. A virtual machine may be moved to an adapter port associated with its current logical number to preserve connectivity.

In operation, the forwarding cache 374 may evaluate a VLAN tag of a routing key to forward a received data frame. The determined VLAN may be used to focus only on those entries of the forwarding cache 374 associated with the determined VLAN. The logical network identifier of the routing key may be evaluated to further focus the address lookup operation on entries of the forwarding cache 374 that are associated with both the determined VLAN and the logical network determined from the logical network identifier.

The forwarding caches 374, 376, 378, and 380 of the distributed virtual bridge 308 may have a format similar to the global forwarding table 311 of the controlling bridge 348.

The forwarding caches 374, 376, 378, and 380 may have smaller memory capacities than the global forwarding table 311. The forwarding caches 374, 376, 378, and 380 may further be updated with address data learned from data frames that flow through the bridge elements 326, 328, 330, and 332.

The address data may additionally be updated with address data received from the global forwarding table 311. Invalid or changed address data that is updated within one or more of the forwarding caches 374, 376, 378, and 380 of the bridge elements 326, 328, 330, and 332 may be communicated to the global forwarding table 311 of the controlling bridge 348. For example, the bridge element 326 may learn a new MAC address of a newly added device that is configured to receive from or send data to the distributed virtual bridge 308.

The bridge element 326 may verify that a source MAC address included within a received data frame is allowed at a port by checking a list stored within a memory. The bridge element 326 may send a registration message to the controlling bridge 348 to update the global forwarding table 311 with the verified MAC address. The bridge element 326 may further store the MAC address within the forwarding cache 374. In another example, the bridge element 326 may identify a MAC address that is not frequently used the forwarding cache 374. This MAC address may be removed from the forwarding cache 374 to make storage room for other MAC addresses. The bridge element 326 may send an update message to the controlling bridge 348 to have the MAC address removed from the global forwarding table 311.

Address data stored within the global forwarding table 311 may be communicated to one or more forwarding caches 374, 376, 378, and 380 of the distributed virtual bridge 308. For example, the bridge element 326 may receive a data frame that includes a destination MAC address that is not stored within the forwarding cache 374. To obtain information for forwarding the data frame, the bridge element 326 may send a query to a bridge element 339 configured to access the controlling bridge 348. The bridge element 339 may search the global forwarding table 311 for address data associated with the destination MAC address. If found, the bridge element 339 may forward the MAC address through the distributed virtual bridge 308 to the querying bridge element 326. The bridge element 326 may store the MAC address as address data within the forwarding cache 374. As with the global forwarding table 311, the address data included within the forwarding caches 374, 376, 378, and 380 of the distributed virtual bridge 308 may include both internal address information, as well as addresses that are external to the system 300.

Each of the bridge elements 326, 328, 330, and 332 may be connected to one or more transport layer modules 382, 384, 386, and 388. The transport layer modules 382, 384, 386, and 388 may include buffering used for attachment to the integrated switch router 342. The transport layer modules 382, 384, 386, and 388 may further provide a frame-based, Ethernet-like interface to integrated switch router 342.

The transport layer modules 382, 384, 386, and 388 may each include a shared buffer used to transmit frames across the integrated switch router 342. Additional buffers of the transport layer modules 382, 384, 386, and 388 may be used to receive data frames from the integrated switch router 342. The buffers may be divided among different virtual lanes. Virtual lanes may include logically separated paths for data frame traffic flowing between a bridge element and a transport layer module. For example, there may be four virtual lanes between the bridge element 326 and the transport layer module 382. The transport layer modules 382, 384, 386, and 388 may include logic to recover from faulty microchips and links between a source and a destination. The transport layer modules 382, 384, 386, and 388 may maintain a strict ordering of packets within the same virtual lane regardless of each data frame's path through the local rack interconnect network 390 and the computer system 300.

The integrated switch router 342 may communicate with the transport layer modules 382, 384, 386, and 388 and may facilitate routing and packet delivery to and from the local rack interconnect network 390. The local rack interconnect network 390 may include links to the bridge elements 326, 328, 330, and 332 located within the same chassis and rack, as well as links to the bridge elements 333-340 in different chassis and racks. The local rack interconnect network 390 may include point-to-point connections, or pipes, between bridge elements 326, 328, 330, 332, and 333-340 of the distributed virtual bridge 308 with no loss and with in-order frame delivery.

The second server computer 304 may include a server computer similar to the first server computer 302 and may be similar to the server computer 216 of FIG. 2. As such, the second server computer 304 may be located within a different chassis and rack than the first server computer 302. Similar to the first server computer 302, the second server computer 304 may include a processor 399 coupled to a memory 397 and an operating system 395. The second server computer 304 may further include virtual machines 355, 357, 359, 361, 363, and 365.

A hypervisor 367 may be coupled to the virtual machines 357, 359. The hypervisor 367 may include a hypervisor virtual bridge 371 that allows direct communication between the virtual machines 357, 359. Similarly, a hypervisor virtual bridge 373 of a hypervisor 369 coupled to the virtual machines 363, 365 may facilitate direct communication between the virtual machines 361, 363. For example, the hypervisor virtual bridges 371, 373 may register address data with the controlling bridge 348.

The second server computer 304 may also include one or more adapters 318, 320, 322, and 324, such as converged CEE network adapters. Each adapter 318, 320, 322, and 324 may be coupled to one or more of the virtual machines 355, 357, 359, 361, 363, and 365. The adapters 318, 320, 322, and 324 may each include a converged adapter virtual bridge 375, 377, 379, and 381. The converged adapter virtual bridges 375, 377, 379, and 381 may facilitate sharing of the adapters 318, 320, 322, and 324 by coordinating virtual machine access. The adapters 318, 320, 322, and 324 may each couple to one or more of the bridge elements 334, 336, 338, and 340 of the distributed virtual bridge 308. Each adapter 318, 320, 322, and 324 may include one or more CEE transmit ports that couple to one of the bridge elements 334, 336, 338, or 340.

Each bridge element 334, 336, 338, and 340 may include a forwarding cache 383, 385, 387, and 389 that includes address data used to forward data frames that are received by the bridge elements 334, 336, 338, and 340. The bridge elements 334, 336, 338, and 340 may each be connected to one or more transport layer modules 315, 317, 319, and 321. The transport layer modules 315, 317, 319, and 321 may include buffering used for the attachment to the integrated switch router 346. The transport layer modules 315, 317, 319, and 321 may further provide a frame-based, Ethernet-like interface to the integrated switch router 346 and may maintain packet ordering. A portion of the distributed virtual bridge 308 shown in FIG. 3 above the local rack interconnect network 390 as being associated with the first and second server computers 302, 304 may be referred to as a north portion. The bridge elements 326, 328, 330, 332, 334, 336, 338, and 340 may couple to the adapters 310, 312, 314, 316, 318, 320, 322, and 324.

The I/O blade device 306 may be the I/O server computer 258 of FIG. 2. As such, the I/O blade device 306 may allow uplink connectivity to the external Ethernet 392 via an integrated switch router 342 that is coupled to the transport layer modules 323, 325, 327, 329, and 331.

The transport layer modules 323, 325, 327, 329, and 331 may each couple to a bridge element 333, 335, 337, and 339. The bridge elements 333, 335, 337, and 339 may each include a forwarding cache 341, 343, 345, and 347. The I/O blade device 306 may be categorized as being included within a south portion of the distributed virtual bridge 308 because the bridge elements 333, 335, 337, and 339 of the I/O blade device 306 may be coupled to an uplink to the Ethernet 392.

The I/O blade device 306 may include a memory 309, an operating system 391, and a processor 353 that includes the controlling bridge 348. The bridge element 339 may be coupled to the processor 353 via an Ethernet link connection 351. The transport layer module 331 may be coupled to a PCIe bus 344 that is coupled via a PCIe link connection 349 to the processor 353 and the controlling bridge 348. The PCIe bus 344 may also be coupled to a PCIe slot 393.

The controlling bridge 348 may directly or indirectly communicate with, or otherwise be coupled to, the bridge elements 326, 328, 330, and 332-340 and other controlling bridges (not shown) of the computer system 300. The controlling bridge 348 may include firmware executing on the processor 353 that manages the bridge elements 326, 328, 330, and 332-340. For example, the controlling bridge 348 may be configured to divide a workload between the bridge elements 326, 328, 330, and 332-340, as well as perform synchronization procedures and failover operations.

The controlling bridge 348 may include the Fiber Channel Forwarder 313. The FCoE forwarder 313 may include firmware that encapsulates and de-encapsulates fiber channel data frames (e.g., FCoE formatted data frames). FCoE may offer the capability to transport fiber channel payloads on top of an Ethernet network.

The controlling bridge 348 may additionally include the global forwarding table 311. The global forwarding table 311 may include address data (e.g., MAC addresses) that is registered and maintained through communication and cooperation with the bridge elements 326, 328, 330, and 332-340, and in some cases, the hypervisors 362, 367, and 369.

In one example, the global forwarding table 311 may maintain MAC addresses that have been learned by a bridge element 326. The bridge element 326 may register the address with the controlling bridge 348. The controlling bridge 348 may update the global forwarding table 311 by adding the address to the global forwarding table 311. Similarly, a bridge element 326 may cause the controlling bridge 348 to update the global forwarding table 311 by sending an update message to the controlling bridge 348. The update message may cause the controlling bridge 348 to delete a MAC address that has been aged out by a bridge element 326. A MAC address may further be deleted when the bridge element 326 has detected that the address data is no longer valid.

In another example, a hypervisor virtual bridge 364 may register MAC addresses or other address data with the controlling bridge 348. The global forwarding table 311 may include address data associated with addresses that are included within the system 300, as well as addresses that are external to the system 300.

FIG. 3 thus shows an embodiment of a system 300 that includes the distributed virtual bridge 308 configured for lossless, point-to-point, in-order data frame delivery. A portion of the distributed virtual bridge 308 (e.g., the bridge element 326, the transport layer module 382, and the integrated switch router 342) may be coupled directly to the server computer 302. The system 300 may support Fiber channel over Ethernet (FCoE) and may be scalable to include hundreds or more server computers with direct connectivity. A data frame may be forwarded directly between different racks and chassis without traversing a top of rack switch.

Figure 4:
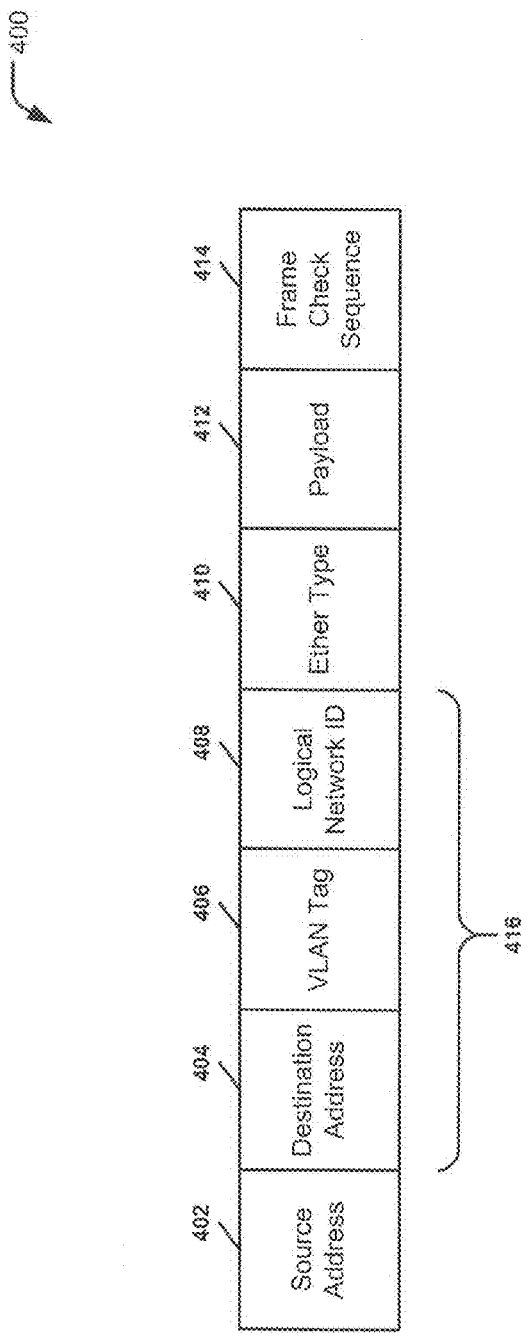
FIG. 4 is a diagram of a data frame configured to be forwarded by the system of FIG. 3.

FIG. 4 is an embodiment of an illustrative data frame 400 that may be forwarded by the system 300 of FIG. 3. The data frame 400 may include address data, such as MAC addresses (e.g., a source address 402) and a routing key used by the distributed virtual bridge 308 of FIG. 3 to forward the data frame 400.

In addition to the source address 402, the data frame 400 may include a destination address 404. The destination address 404 and the source address 402 may comprise MAC addresses. MAC addresses are typically constructed by a Fiber Channel Forwarder, such as the Fiber Channel Forwarder 313 of FIG. 3. An illustrative MAC address may include a combination of three-bytes of a destination identifier associated with a destination node (e.g., a MAC address of a server computer or virtual machine) with three-bytes of Fiber Channel (FC) mapping information assigned by the Fiber Channel Forwarder 313. A MAC address of an embodiment may include an Internet Protocol address.

A logical network identifier 406 may indicate a logical network associated with the data frame 400. A logical network may be included to provide an additional layer of traffic separation. In one example, the logical network identifier 406 may be assigned by an adapter or a bridge element that receives the data frame 400. In another example, the logical network identifier 406 may be included when the data frame 400 is generated. Forwarding of the data frame 400 may occur within the assigned logical network. A VLAN tag 408 may indicate a VLAN assigned to the data frame 400.

The Ether Type 410 of the data frame 400 may indicate a protocol of the payload 412. For example, the Ether Type 410 may indicate that the protocol of the payload is FCoE or Internet Protocol. The Frame Check Sequence (FCS) 414 may include a checksum added to the data frame 400 for error detection and correction.

In operation, a bridge element may receive the data frame and look up a MAC address stored within a forwarding cache by reading the routing key 416. Only those forwarding cache entries that are associated with the VLAN tag 408 may be searched within the forwarding cache. The logical network identifier 406 of the routing key 416 may be evaluated to further focus the address lookup operation of entries of the forwarding cache. The data frame 400 of FIG. 4 may thus be forwarded according to the logical network identifier 406, the VLAN tag 408, and the address data (e.g., the destination address 404).

Figure 5:
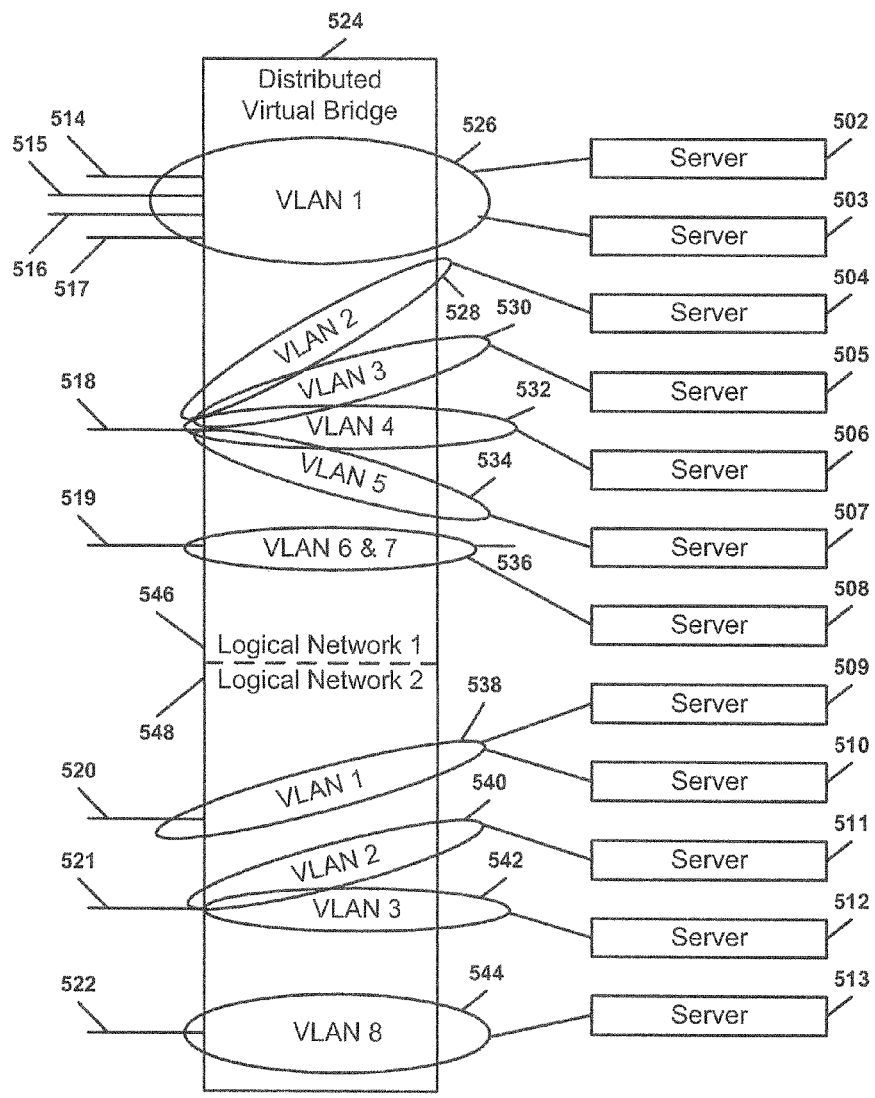
FIG. 5 is a diagram of a particular embodiment of a method to respond to error detection.

FIG. 5 is an embodiment of a system 500 that depicts logical connectivity between a plurality of server computers 502-513 that are coupled to physical ports 514-522 via a distributed virtual bridge 524. The connectivity may be divided and segregated by assigning or otherwise associating VLANs 526, 528, 530, 532, 534, 536, 538, 540, 542, and 544 and logical networks 546 and 548 to server computers 502-513 and ports 514-522.

Each of the server computers 502-513 may be similar to the server computers 302, 304 (e.g., blade server computers) shown in FIG. 3. The distributed virtual bridge 524 may be similar to the distributed virtual bridge 308 of FIG. 3, and the physical ports 514-522 may be coupled to an Ethernet or other network, such as the Ethernet 392 of FIG. 3.

As shown in FIG. 5, a first VLAN 526 may be associated with the server computers 502, 503 and the ports 514-517. As such, only the server computers 502, 503 may communicate using the first VLAN 526 over the ports 514-517. The multiple ports 514-517 may be used in parallel to form an aggregated link.

A second VLAN 528, a third VLAN 530, a fourth VLAN 532, and a fifth VLAN 534 may share access to the port 518. The second VLAN 528 may be associated with the server computer 504. The third VLAN 530 may be associated with the server computer 505, and the fourth VLAN 532 may be associated with the server computer 506. The fifth VLAN 534 may be associated with the server computer 507. The server computer 508 may be associated with six and seventh VLANs 536.

The VLANs 526, 528, 530, 532, 534, and 536 may be associated with a first logical network 546. The server computers 502-508 and the ports 514-519 may also be associated with the first logical network 546.

Data frames received by a bridge element of the distributed virtual bridge 524 may include a logical network identifier that is used to route the data frame to the identified first logical network 546. Data frames routed to the first logical network 546 may be segregated from other logical networks (e.g., the second logical network 548). A VLAN tag of the data frame may identify a VLAN 526 associated with the identified logical network 546. As such, two customers using the same VLAN tag (e.g., "VLAN 1") may achieve that the data frames are separately routed and segregated by using different logical network identifiers.

As shown in FIG. 5, the first VLAN 538 of a second logical network 548 may be associated with the server computers 509, 510 and the port 520. The first VLAN 538 may be associated with the same VLAN tag (e.g., "VLAN 1") as the first VLAN 526 of the first logical network 546. The second VLAN 540 and the third VLAN 542 may share access to the port 521. The second VLAN 540 of the second logical network 548 may include the server computer 511. The second VLAN 540 of the second logical network 548 may include the same VLAN tag (e.g., "VLAN 2") as the second VLAN 528 of the first logical network 546. The third VLAN 542 of the second logical network 548 may include the server computer 512, and the eighth VLAN 544 may include the server computer 513 and the port 522.

FIG. 5 thus shows a logical representation of segregated communications within a distributed virtual bridge 524 having VLANs 526, 528, 530, 532, 534, and 536 and logical networks 546, 548. A data frame may be routed within the distributed virtual bridge 524 using a VLAN tag and a logical network identifier. The different networks 546, 548, may allow for a layer of traffic separation in addition to the VLANs 526, 528, 530, 532, 534, and 536. VLANs 528, 540 having the same VLAN tag may be used within the different logical networks 546, 548 to preserve separate communication channels.

Figure 6:
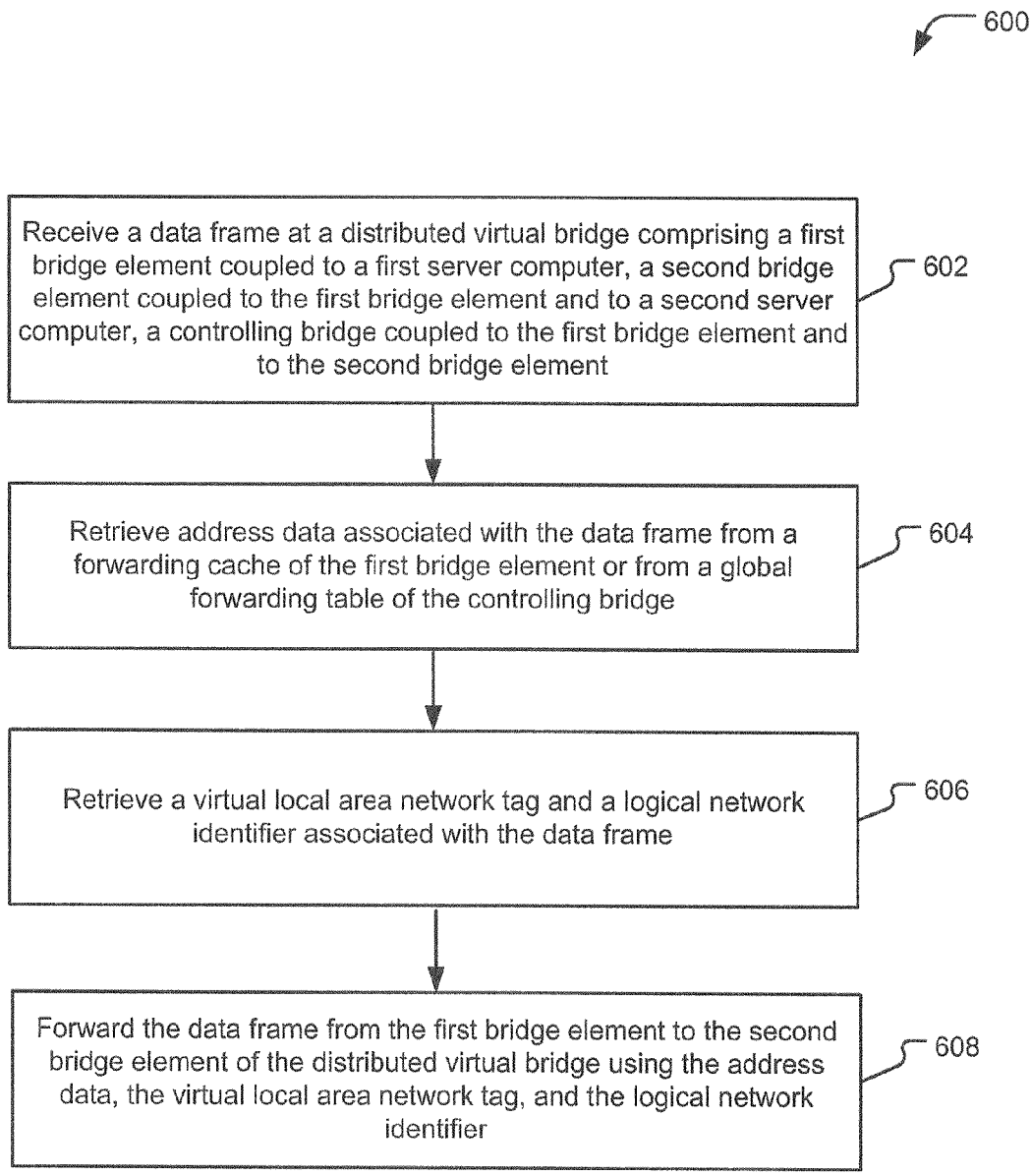
FIG. 6 is a flow diagram of a first embodiment of a method of forwarding data.

FIG. 6 is a flow diagram of an embodiment of a method of forwarding a data frame and is generally designated 600. In a particular embodiment, the method 600 is performed by the system 300 of FIG. 3. The method 600 includes receiving a data frame at a distributed virtual bridge, at 602. As shown in FIG. 3, an illustrative distributed virtual bridge 308 may include a first bridge element 326 coupled to a first server computer 302. The distributed virtual bridge 308 may further include a second bridge element 334 coupled to (e.g., in communication with) the first bridge element 326 and to a second server computer 304. A controlling bridge 348 of the distributed virtual bridge 308 may be coupled to the first bridge element 326 and to the second bridge element 334.

Address data associated with the data frame may be retrieved from a forwarding cache of the first bridge element or from a global forwarding table of the controlling bridge, at 604. For example, address data may be retrieved from the forwarding cache 374 of the bridge element 326 or from the global forwarding table 311 of the controlling bridge 348 of FIG. 3.

A virtual local area network tag and a logical network identifier may be retrieved from a data frame, at 606. For example, the bridge element 326 of FIG. 3 may retrieve a local area network tag and a logical network identifier from an arriving data frame.

The data frame may be forwarded from the first bridge element to the second bridge element of the distributed virtual bridge using the address data, the virtual local area network tag, and the logical network identifier, at 608. For instance, the data frame may be forwarded from the bridge element 326 of FIG. 3 to the bridge element 334 of the distributed virtual bridge 308 using the address data, the virtual local area network tag, and the logical network identifier.

FIG. 6 thus shows a method 600 that facilitates lossless, point-to-point, in-order frame delivery of a data frame between bridge elements of a virtual distributed bridge. The data frame may be forwarded between different racks and chassis without traversing a top of rack switch.

Figure 7:
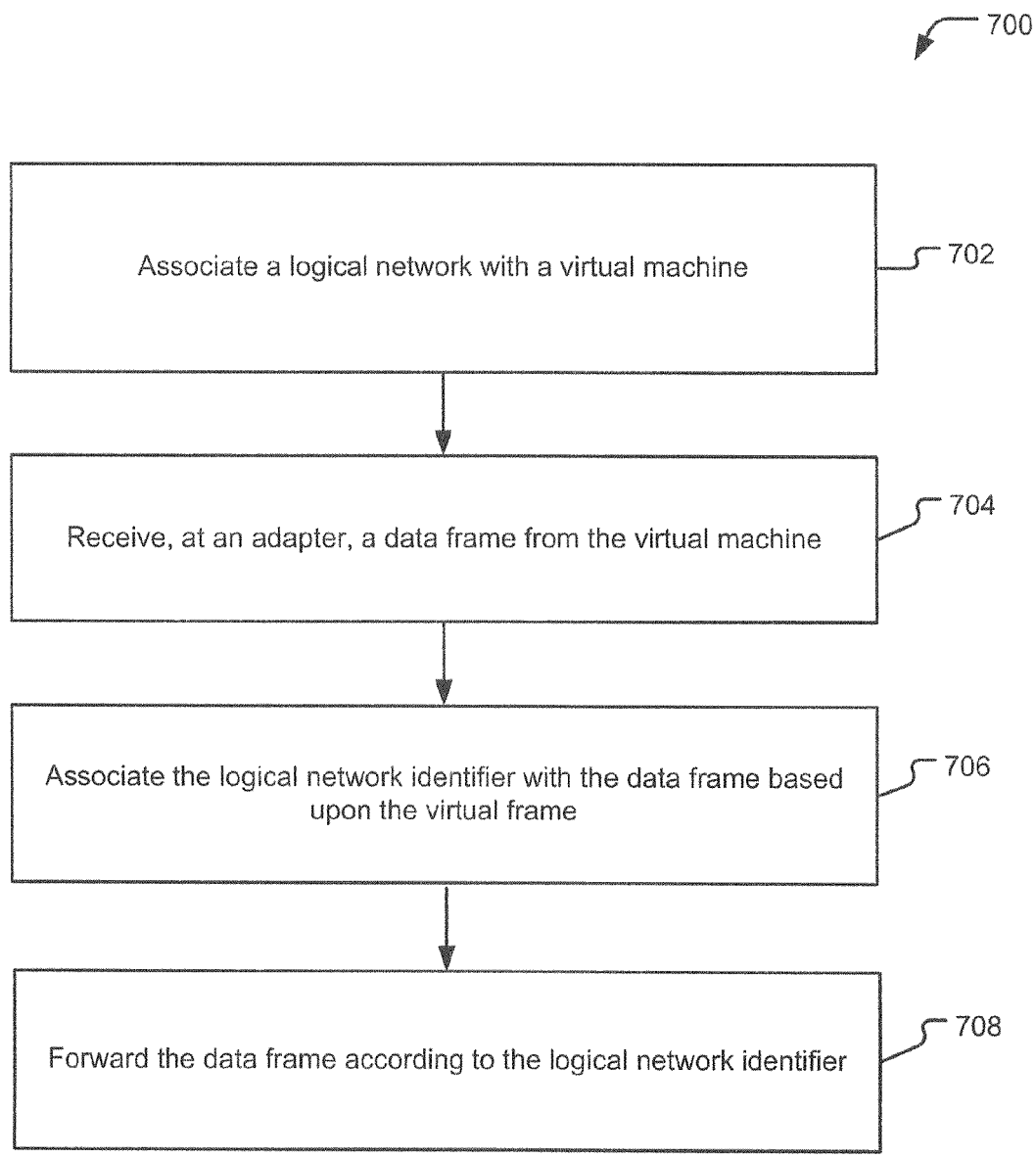
FIG. 7 is a flow diagram of a second embodiment of a method of forwarding data.

FIG. 7 is a flow diagram of an embodiment of a method of forwarding a data frame and is generally designated 700. In a particular embodiment, the method 700 may be performed by the system 300 of FIG. 3. The method 700 includes associating a logical network with a virtual machine, at 702. For example, an administrator may assign a logical network identifier to a virtual machine, such as the virtual machine 350 of FIG. 3. The assignment may result in communications sent from the virtual machine 350 being recognized and associated with the logical network identifier and corresponding logical network.

For instance, a data frame may be received from the virtual machine at an adapter, at 704. The adapter may associate the logical network identifier with the data frame based upon the virtual machine, at 706. As shown in FIG. 3, the adapter 310 may receive a data frame from the virtual machine 350. The adapter 310 may recognize that the data frame was received from the virtual machine 350. For example, the data frame may include a source address or other identifier in the data frame that indicates that the virtual machine 350 originated the data frame. The adapter 310 may use the source address or other identifier in the data frame to look up or otherwise determine the logical identifier associated with the virtual machine 350. The adapter 310 may assign the determined logical identifier to the data frame.

The data frame may be forwarded according to the logical network identifier, at 708. For example, the bridge element 326 of FIG. 3 may forward the data frame throughout the distributed virtual bridge 308 and the system 300 using the logical network identifier.

FIG. 7 thus shows a method 700 that includes associating a logical network identifier with a data frame at an adapter. The association may occur automatically when the adapter recognizes the source of the data frame, such as a virtual machine associated with the logical network. The automatic association may allow segregation between different customers desiring to use the same VLAN tag. The method 700 may further facilitate lossless, point-to-point communications with in-order frame delivery.

Figure 8:
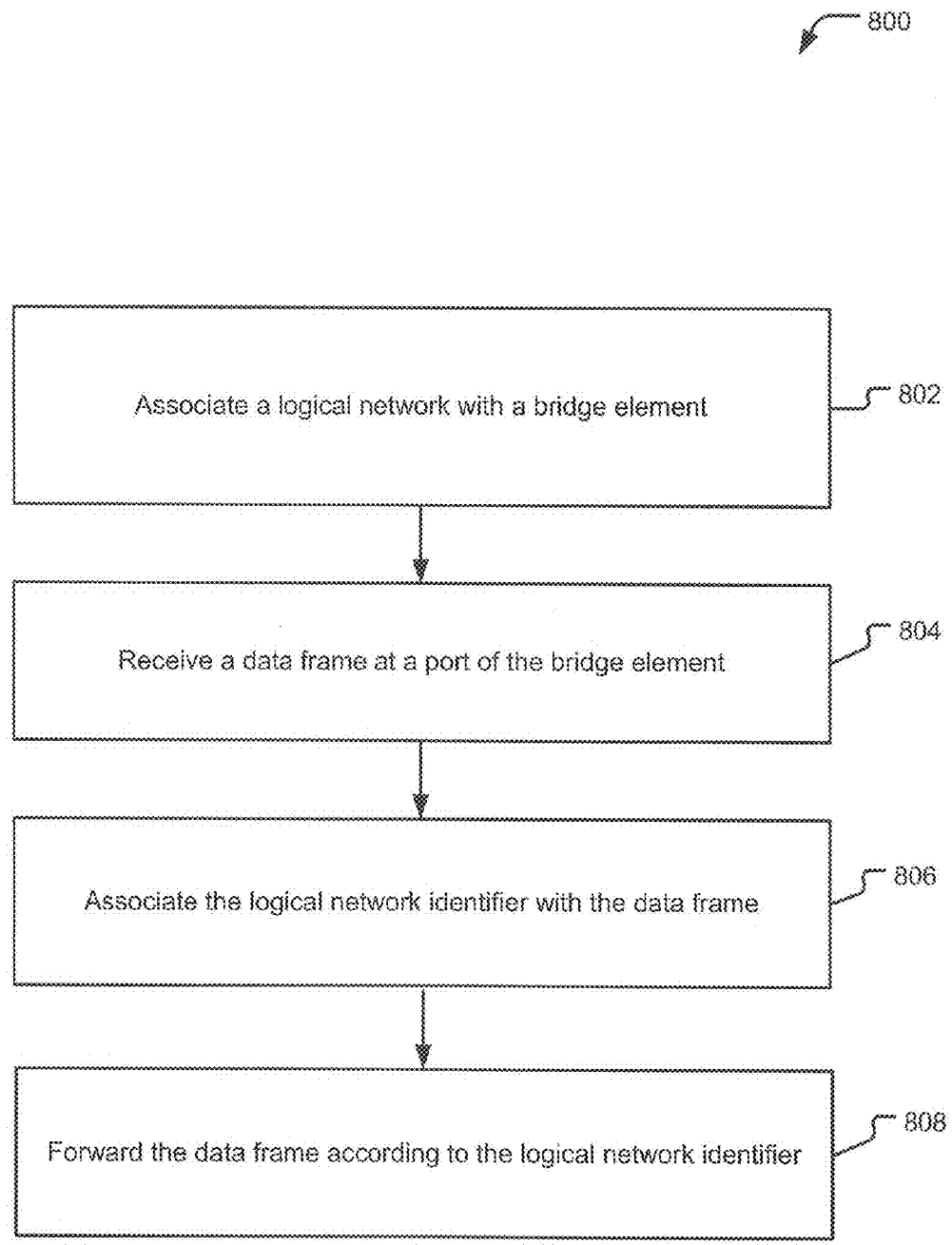
FIG. 8 is a flow diagram of a third embodiment of a method of forwarding data.

FIG. 8 is a flow diagram of another embodiment of a method of forwarding data frames and is generally designated 800. In a particular embodiment, the method 800 is performed by the system 300 of FIG. 3. The method 800 includes associating a logical network with a bridge element, at 802. For example, an administrator may assign a logical network identifier to a bridge element, such as the bridge element 326 of FIG. 3. The assignment may result in communications arriving at the bridge element 326 being associated with the logical network identifier and corresponding logical network.

The data frame may be received at a port of the bridge element, at 804. For instance, the data frame may be received at the bridge element 326 of FIG. 3.

The data frame may be associated with the logical identifier and corresponding logical network, at 806. For example, that data frame 400 of FIG. 4 may be assigned the logical identifier 408. The data frame may be forwarded according to the logical network identifier, at 808.

FIG. 8 thus shows a method 800 that includes associating a logical network identifier with a data frame at a bridge element. The association may occur automatically when the data frame arrives at a port of the bridge element and may allow for a layer of data frame separation, in addition to that provided by VLANs.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc-read only memory (CD-ROM), compact disc-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. An apparatus comprising:
   a plurality of racks, wherein each rack of the plurality of racks includes a plurality of chassis, wherein each chassis of the plurality of chassis includes a plurality of server computers; and
   a distributed virtual bridge coupled to the plurality of server computers, wherein the distributed virtual bridge is coupled to a plurality of adapters, and wherein the distributed virtual bridge comprises:
      a plurality of bridge elements coupled to the plurality of server computers and configured to forward a data frame between the plurality of server computers to server computers of different racks of the plurality of racks, different chassis of the plurality of chassis, or any combination thereof; and
      a controlling bridge coupled to the plurality of bridge elements, the controlling bridge including a global forwarding table that includes address data accessible to the plurality of bridge elements, wherein at least one bridge element of the plurality of bridge elements is configured to send a query to the controlling bridge for information for forwarding the data frame.

2. The apparatus of claim 1, wherein the distributed virtual bridge further comprises an integrated switch router configured to route the data frame forwarded by a bridge element of the plurality of bridge elements.

3. The apparatus of claim 1, wherein a bridge element of the plurality of bridge elements includes a forwarding cache that includes the address data.

4. The apparatus of claim 1, wherein a bridge element of the plurality of bridge elements is configured to learn at least a portion of the address data.

5. The apparatus of claim 1, wherein a bridge element of the plurality of bridge elements is configured to initiate updating the address data of the global forwarding table.

6. The apparatus of claim 1, wherein the address data includes a media access control address.

7. The apparatus of claim 1, wherein the data frame is forwarded without travelling through a top of rack switch.

8. The apparatus of claim 1, wherein at least one of a bridge element of the plurality of bridge elements and an adapter assigns a logical network identifier to the data frame.

9. The apparatus of claim 1, wherein the data frame includes a first logical network identifier associated with a first logical network and a first virtual local area network tag associated with a first virtual local area network.

10. The apparatus of claim 1, wherein the plurality of server computers comprise a plurality of virtual machines.

11. The apparatus of claim 1, wherein the plurality of adapters is located within the plurality of server computers, coupled to the plurality of server computers, or any combination thereof.

12. The apparatus of claim 1, wherein the at least one bridge element of the plurality of bridge elements is configured to send the query when the data frame includes a destination address not stored with a forwarding cache.

13. The apparatus of claim 2, wherein the distributed virtual bridge further comprises a transport module coupled to the bridge element of the plurality of bridge elements and configured to provide a frame-based interface to the integrated switch router.

14. The apparatus of claim 9, wherein a second data frame includes a second logical network identifier associated with a second logical network and a second virtual local area network tag that is identical to the first virtual local area network tag and that is associated with a second virtual local area network, and wherein the first virtual local area network is isolated from the second virtual local area network.

15. The apparatus of claim 12, wherein the controlling bridge is configured to send address data to the at least one bridge element of the plurality of bridge elements in response to receiving the query.

16. A method of forwarding a data frame, the method comprising:
   receiving a data frame at a distributed virtual bridge comprising:
      a first bridge element coupled to a first server computer of a first chassis of a first rack;
      a second bridge element coupled to the first bridge element and to a second server computer of a second chassis, a second rack, or any combination thereof; and
      a controlling bridge coupled to the first bridge element and to the second bridge element, the controlling bridge including a global forwarding table configured to store address data received from the first bridge element; and
   sending, from the first bridge element, a query to the controlling bridge for information for forwarding the data frame; and
   forwarding the data frame from the first bridge element to the second bridge element of the distributed virtual bridge using the address data.

17. The method of claim 16, further comprising storing the address data in at least at one of the global forwarding table and a forwarding cache included within the first bridge element.

18. The method of claim 16, further comprising forwarding the data frame from the first bridge element to the second bridge element of the distributed virtual bridge using a virtual local area network tag and a logical network identifier associated with the data frame.

19. The method of claim 16, wherein the distributed virtual bridge is coupled to a plurality of adapters.

20. A program product, comprising:
   program code resident within a memory and configured to be executed by a processor to forward a data frame between server computers by receiving a data frame at a distributed virtual bridge comprising a first bridge element coupled to a first server computer of a first chassis of a first rack, a second bridge element coupled to the first bridge element and to a second server computer of a second chassis, a second rack or any combination thereof, and a controlling bridge coupled to the first bridge element and to the second bridge element, the controlling bridge including a global forwarding table, wherein the program code is further configured to be executed by the processor to send, from the first bridge, a query to the controlling bridge for information for forwarding the data frame, wherein the program code is further configured to be executed by the processor to forward the data frame from the first bridge element to the second bridge element of the distributed virtual bridge using address data associated with the data frame; and
   a non-transitory computer readable medium bearing the program code.

* * * * *